Patented Dec. 25, 1951

2,580,234

UNITED STATES PATENT OFFICE 2,580,234

ACYLATION OF DIARYLGUANIDINE SALTS OF DIAMINOSTILBENE SULFONIC ACIDS

Hans Z. Lecher, Plainfield, and Dale R. Eberhart, Bound Brook, N. J., assignors to American Cyanamid Company, New York, N. Y., a corporation of Maine No Drawing. Original application April 26, 1951, Serial No. 223,174. Divided and this application April 4, 1950, Serial No. 153,992

6 Claims. (Cl. 260—507)

The present invention relates to the acylation of aminosulfonic acids. More particularly, it is concerned with the acylation of aminosulfonic acids of the stilbene and dibenzothiophenedioxide series. Acylation of the latter forms the subject matter of the divisional application of Eberhart and Lecher for the United States Letters Patent, Serial No. 223,174, filed April 26, 1951.

Many of the compounds of the types of the present invention are important dyestuff intermediates. Many of their acylated derivatives possess marked fluorescent properties. Some of the latter are particularly useful to overcome the yellowish cast which is caused by various factors in many different white materials, especially cellulosic fabrics. These compounds, however, are not claimed per se in the present application. They form in part the subject matter of United States Patent No. 2,468,431, issued April 26, 1949, and in part the subject matter of the copending application of Scalera, Eberhart and Forster for United States Letters Patent, Serial No. 125,850, filed November 5, 1949.

Despite their desirability in use, the commercial exploitation of these materials has been hampered by the lack of a generally suitable acylation method of preparing them. It has been found that the known methods of acylation are not suitable for industrial development when an attempt is made to apply them to these materials. Many difficulties are encountered.

For example, while many amino compounds are readily acylated with acid halides in aqueous solution, 4,4'-diaminostilbene - 2,2'-disulfonic acids can be so acylated only in certain cases. In other cases, it is found that the acid halide is exceedingly sensitive to water. Consequently, an attempted reaction gives little or none of the desired product, the acid halide instead being mostly destroyed by hydrolysis.

In still other cases, where the halide may not be quite so sensitive, and is not destroyed so rapidly or completely, the results are unsatisfactory for other reasons. For example, it is often found that the mono-acylated derivative of a diaminostilbenedisulfonic acid is very insoluble in water and precipitates out, resisting complete acylation. This not only seriously reduces the yield of the desired product, but the latter is heavily contaminated by a deleterious by-product. The latter because of the similarity in solubilities, is very difficult to remove. Furthermore, the wastage of acyl halide in these reactions is found to be prohibitive. These difficulties have been found to be especially troublesome in the attempted acylation of diaminostilbenedisulfonic acids with alkoxy-substituted benzoyl halides.

Non-polar organic solvents have been used successfully in many similar types of acylations. However, they have not been utilized with these aminosulfonic acids. Neither the free acids nor their metal salts can be satisfactorily acylated in an organic medium. Their solubility is too low. Further, the amino groups of the free acid are rendered comparatively inert to acylation under these conditions. This appears to be due to association with the sulfonic acid groups in Zwitter ion form which appears to resist the action of the acyl halide.

If these difficulties could be successfully overcome, there would exist a demand for both the successful procedure and its products. It is therefore, the principal object of the present invention to devise an acylation method suitable for use with these compounds for which the known procedures were not satisfactory.

In general, the object of the present invention has been accomplished by carrying out the reaction in a non-polar solvent in the presence of an organic base. In view of the difficulties encountered in the past, the effectiveness of the process of the present invention is particularly surprising, especially with those compounds, such as alkoxy-substituted benzoyl halides, that are exceptionally difficult to use because of their unusual sensitivity. In all cases, the products are obtained in satisfactory quality and yield.

Presence of the organic base apparently has the effect of breaking up the stable Zwitter ion structure of the aminosulfonic acid, and of enhancing the solubility in the solvent. In any case, the desired acylation is accomplished by converting the aminosulfonic acid to its salt with the organic base and treating the resultant salt with the acyl halide in a non-polar solvent.

In accordance with the present invention, symmetrical diarylguanidines have been found very suitable for this salt formation. They readily form well-defined crystallizable salts with the stilbene aminosulfonic acids of the present invention. These salts are smoothly acylated in organic solvents. After acylation is complete, the reaction mixture is made alkaline, breaking down the diaryl guanidine salt of the product. A particularly useful solvent is nitrobenzene, permitting an easy recovery of both the reaction product and the diarylguanidine. The reaction product is made alkaline with an organic alkali salt, for example sodium acetate, potassium propionate, sodium ethylate, sodium phenoxide, sodium lactate, potassium p-chlorophenoxide, and the like. The nitrobenzene retains the diarylguanidine in solution and permits its removal with the organic solvent; the acylated sulfonic acid is out of solution as the alkali salt and can be isolated by known methods.

A wide variety of sulfonic acids may be treated by the present invention. Among these may be mentioned particularly aminosulfonic acids of the stilbene and dibenzothiophene series, such as 4-nitro-4'-aminostilbene-2,2'-disulfonic acid, 4,4'-diaminostilbene-2,2'-disulfonic acid, 4,4'-diamino-5,5'-dichlorostilbene-2,2'-disulfonic acid, oxide-2,8-disulfonic acid and its alkyl and chloro and 6,6'-diamino-4,4'-diisopropylstilbene-2,2'-disulfonic acid and its homologs.

A wide variety of symmetrical diaryl substituted guanidines can be used successfully in the process of the present invention. Among these may be included diphenylguanidine, phenyl-o-tolylguanidine, di-o-tolylguanidine, di-p-tolylguanidine, dixylylguanidines, phenyl-p-anisylguanidine, benzyldiphenylguanidine, bis-p-chlorophenylguanidine, di-o-anisylguanidine, di-p-phenetylguanidine, di-naphthylguanidine, and di-2-pyridylguanidine.

A number of solvents are suitable for the purpose of carrying out the acylation process of the present invention. It is essential that they have solvent action on the product and that they be stable to the reactants. In general, organic solvents boiling above about 120° C. are to be preferred. Suitable solvents include both aliphatic and aromatic hydrocarbons and their halogeno and nitro derivatives, as well as esters, ethers, and ketones. By way of specific example, the following solvents are effective: mono- and dichlorobenzene and the chlorotoluenes; the xylenes; nitrobenzene and the nitrotoluenes; cymene, acetylene tetrachloride, acetophenone, cyclohexanone, and anisole.

It is an advantage of the present invention that the salts can be prepared by any suitable method. For example, the aminosulfonic acid can be dissolved in water, neutralized, and treated in aqueous solution with a soluble salt of the guanidine. The desired salt crystallizes directly from the solution. It is not necessary for the purpose of this invention that the salt be strictly pure or dry. It is dispersed in the selected organic solvent. A convenient practice at this point is to remove any water present by distilling a part of the solvent. Acylation is then readily effected by adding the acyl halide to the mixture.

A suitable acyl halide may be selected from a wide variety of aliphatic and aromatic carboxylic acids. These include, for example, benzoyl chloride and its alkylated, nitrated, and halogenated derivatives; butyryl chloride, ethanesulfonyl chloride, chloroacetyl chloride, crotonyl chloride, propionyl bromide, p-toluenesulfonyl chloride, thiophene-2-carboxylic acid chloride, alpha-naphthoyl chloride, 2-hydroxy-3-naphthoyl chloride, benzoyl bromide, nicotinyl chloride and acetylsulfanilyl chloride, as well as such bifunctional compounds as terephthaloyl chloride, succinoyl chloride, and adipoyl chloride. As has been mentioned, the process of the present invention is particularly useful in utilizing the acid chlorides of alkoxy-substituted benzoic acids, such as the isomeric anisoyl chlorides, o-ethoxybenzoyl chloride, o-propyloxybenzoyl chloride, and 2,4- and 2,5-dimethoxy benzoyl chlorides.

*Example*

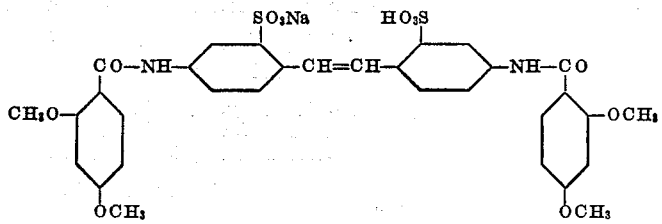

4,4'-diaminostilbene-2,2'-disulfonic acid (74 parts, real basis) is dissolved in 400 parts of water, neutralized with 5 N sodium hydroxide solution, and cooled to about 4° C. by the addition of 400 parts of ice and water. This is converted to the di-o-tolylguanidine salt by the addition of a solution prepared from 105 parts of di-o-tolylguanidine, 48 parts of concentrated hydrochloric acid, and 400 parts of ice and water. The precipitated salt is filtered, washed, and dried.

25.5 parts of the salt, prepared as described, is added to 144 parts of nitrobenzene and heated to 125° C. To this is added the acid chloride prepared in the normal manner from 16.4 parts of 2,4-di-methoxybenzoic acid and 16.2 parts of thionyl chloride. The temperature is then gradually raised, the acylation being completed at 150° C. The reaction mixture is then cooled to 78° C., and neutralized by the addition of a solution of 11.3 parts of phenol in 29 parts of 5 N sodium hydroxide solution. The product is stirred, filtered, and washed with nitrobenzene. It is then slurried in water and salt, boiled to remove traces of nitrobenzene, cooled, filtered, washed, and dried at 110° C.

The di-o-tolylguanidine is retained in the nitrobenzene solution and is readily recovered for re-use by steam distillation to remove the nitrobenzene.

We claim:
1. The method of acylating a sulfonic acid of 4,4'-diaminostilbene, which comprises heating a mixture comprising a symmetrical diarylguanidine salt of the selected aminosulfonic acid, an acid halide, and an inert organic solvent.
2. A process according to claim 1 in which, after completion of the reaction, the product is precipitated by treatment with an alkaline-reacting organic metal salt.
3. A process according to claim 1 in which the organic solvent is nitrobenzene.
4. A process according to claim 1 in which the symmetrical diarylguanidine is a diphenylguanidine.
5. A process according to claim 1 in which the acid halide is an aroyl chloride.
6. A process according to claim 5 in which the aroyl chloride is an alkoxy substituted benzoyl chloride.

HANS Z. LECHER.
DALE R. EBERHART.

No references cited.